(12) United States Patent
Dalgaard

(10) Patent No.: US 12,036,661 B2
(45) Date of Patent: Jul. 16, 2024

(54) GRIPPER DEVICE CONFIGURED TO BE ATTACHED TO A ROBOTIC DEVICE AND TO PICKUP A FOOD PRODUCT FROM A PICKUP AREA AND TO RELEASE IT FROM A RELEASING LOCATION TO A RECEIVING LOCATION

(71) Applicant: MAREL A/S, Aarhus N (DK)

(72) Inventor: Jens Kongensholm Dalgaard, Aarhus N (DK)

(73) Assignee: MAREL A/S, Arhus N (DK)

( * ) Notice: Subject to any disclaimer, the term of this patent is extended or adjusted under 35 U.S.C. 154(b) by 0 days.

(21) Appl. No.: 18/281,427

(22) PCT Filed: Mar. 11, 2022

(86) PCT No.: PCT/EP2022/056325
§ 371 (c)(1),
(2) Date: Sep. 11, 2023

(87) PCT Pub. No.: WO2022/194701
PCT Pub. Date: Sep. 22, 2022

(65) Prior Publication Data
US 2024/0033941 A1 Feb. 1, 2024

(30) Foreign Application Priority Data
Mar. 19, 2021 (EP) .................................. 21163772

(51) Int. Cl.
*B25J 11/00* (2006.01)
*B25J 15/00* (2006.01)

(52) U.S. Cl.
CPC ....... *B25J 11/0045* (2013.01); *B25J 15/0014* (2013.01)

(58) Field of Classification Search
CPC .................................................... B25J 15/0014
See application file for complete search history.

(56) References Cited

U.S. PATENT DOCUMENTS

| 4,958,409 A | 9/1990 | Braeger et al. |
| 5,151,062 A | 9/1992 | Pontow |

(Continued)

FOREIGN PATENT DOCUMENTS

| DE | 102013017314 A1 | 4/2015 |
| DE | 102015117399 A1 | 4/2017 |

(Continued)

OTHER PUBLICATIONS

"Burger-Flipping Robot Debuts at Restaurant | CNN Business." www.cnn.com, Mar. 6, 2018, www.cnn.com/videos/cnnmoney/2018/03/06/flippy-burger-grilling-robot-fast-food-orig.cnn. Accessed Jan. 4, 2024. (Year: 2018).*

(Continued)

*Primary Examiner* — Dana Ross
*Assistant Examiner* — Kevin Guanhua Wen
(74) *Attorney, Agent, or Firm* — Workman Nydegger

(57) ABSTRACT

A gripper device is configured to be attached to a robotic device and to pick up a food product from a pickup area and to release it from a releasing location to a receiving location. A method is provided for picking up a food product from a pickup area and releasing it from a releasing location to a receiving location can be used with the gripper device.

14 Claims, 3 Drawing Sheets

(56) References Cited

U.S. PATENT DOCUMENTS

| | | | |
|---|---|---|---|
| 10,358,241 B2 * | 7/2019 | Findlay | .................. B65B 35/36 |
| 2014/0365009 A1 * | 12/2014 | Wettels | ................. B25J 9/1694 |
| | | | 700/258 |
| 2015/0246444 A1 | 9/2015 | Guidi et al. | |
| 2020/0102155 A1 | 4/2020 | Jacobsen et al. | |

FOREIGN PATENT DOCUMENTS

| | | |
|---|---|---|
| EP | 1986941 B1 | 12/2009 |
| EP | 2479111 A2 | 7/2012 |
| WO | 2007083327 A2 | 7/2007 |
| WO | 2011078664 A1 | 6/2011 |
| WO | WO 2018165105 A1 * 9/2018 ............... A21L 5/10 |
| WO | 2021023800 A1 | 2/2021 |
| WO | WO 2021023800 A1 * 2/2021 ............. A21C 15/00 |

OTHER PUBLICATIONS

International Search Report from corresponding PCT Application No. PCT/EP2022/056325, May 9, 2022.
Extended European Search Report from corresponding EP Application No. 21163772.3, Nov. 10, 2021.

\* cited by examiner

GRIPPER DEVICE CONFIGURED TO BE ATTACHED TO A ROBOTIC DEVICE AND TO PICKUP A FOOD PRODUCT FROM A PICKUP AREA AND TO RELEASE IT FROM A RELEASING LOCATION TO A RECEIVING LOCATION

FIELD OF THE INVENTION

The present invention relates to a gripper device for robotic arm applications.

BACKGROUND OF THE INVENTION

Gripper devices attached to robotic devices comprising manipulation arms are commonly used in the food industry, e.g. for picking up food products and placing them at a receiving location such as trays or boxes. An example of implementation is where chicken fillets are placed into trays where the in-plane orientation of the chicken fillets is adapted to the size and shape of the tray to ensure optimal arrangement in the trays via the necessary rotational movement of the gripper devices before releasing the chicken fillets into the trays.

An example of more challenging task, that today is difficult if not possible with today's gripper devices, is when the arrangement of food products at the receiving location requires rotating or flipping the food products, e.g. rotating them at a pre-set angle, for example 90 or 180 degrees. This may as an example be of relevance when substantially flat food products have on one side having skin and the other side having exposed meat, and where the arrangement requirements is that adjacent layers in a tray or box are laying in a skin-to-skin contact or meat-to-meat contact to prevent contamination between the food products that could be the case if a skin side of one product contacted a meat side of an adjacent product.

SUMMARY OF THE INVENTION

On the above background it is an object of embodiments of the present invention to provide a more advanced gripper device and a method that is capable of performing complex food arrangements at a receiving location, which may include trays, boxes etc.

In general, the invention preferably seeks to mitigate, alleviate or eliminate one or more of the above-mentioned disadvantages of the prior art singly or in any combination. In particular, it may be seen as an object of embodiments of the present invention to provide a gripper device, a system and method that solves the above-mentioned problems, or other problems.

To better address one or more of these concerns, in a first aspect of the invention a gripper device is provided configured to be attached to a robotic device, for example a robotic arm, and to pick up a food product from a pickup area and to release the food product at a releasing location of the gripper device to a receiving location, for example a tray or box.

The gripper device has a first jaw and a second jaw, each jaw having a leading edge, and the jaws are configured to be moved by a moving mechanism relative to each other from a gripping position to an open position, where there is a suitable opening between the leading edges in the open position so that the food product may be controllably released from the gripper device, and vice versa.

During use, the jaws pick up the food product and the robotic device subsequently moves the gripper device to the releasing location, wherein releasing the food product at the releasing location to the receiving location includes moving the first jaw relative to the second jaw from the gripping position to the open position such that one side of the food product is un-supported from the first jaw while an other side of the food product is temporarily resting on the second jaw so as to cause a tilting of the food product around a longitudinal axis of the food product when releasing the food product to the receiving location.

In an embodiment, the leading edge of the first jaw faces the leading edge of the second jaw and the relative movement of the jaws by the moving mechanism includes a linear movement within a same plane. Accordingly, a highly advanced gripper device is provided that is capable of control the rotational movement along the longitudinal axis of the food product when releasing it to the receiving location. This may include any rotational angle, such as an example 45 degrees rotation, 90 degrees rotation, 180 degrees rotation. The food product may be any type of a food product, such as fish fillets or poultry meat such as chicken fillet, where the tilting, which also be referred to as "flipping", may e.g. result in a better packing in e.g. a box or a tray. Another example where this may be of high relevance is where the food product has skin on one side, and where the placement of multiple of such a product requires that they are either placed in a skin-to-skin or meat-to-meat arrangement so as to avoid possible contamination.

In one embodiment, subsequent to moving the first jaw relative to the second jaw from the gripping position to the open position, the second jaw is moved in an upward direction, either by means of moving the gripper device upwards by the robot device or by means of moving the second jaw upwards relative to the first jaw via the moving mechanism. The tilting of the food product may thus be enhanced which may result in that the height of the gripper to the receiving location may be lowered. In this manner, the predictability of how the food product will land on the receiving location is improved.

The term receiving location may according to the present invention be any surface area that received the food product, a tray or a box having an open end facing upwards.

In one embodiment, the moving mechanism is further configured to move the second jaw away from the first jaw while or subsequent to moving the second jaw upwards.

The releasing location may be arranged at a pre-defined height from the receiving location, the pre-defined height being selected such that when the food product is received at the receiving location the food product has rotated around its longitudinal axis in accordance to pre-defined rotational target angle.

Each of the first and the second jaws may comprise a belt of flexible material wrapped around the leading edges of the jaws such that at least part of the belts becomes sandwiched between the jaws and the food product when the jaws penetrate below the food product when picking up the food product (gripping operation). The belts may be arranged such that when the jaws move below the food product and when the jaws release the food product to the receiving location, there is substantially no relative sliding movement between the sandwiched part of the belts and the food product. This helps control the predictability of the placement of the food product at the receiving location as well as preserve the general shape of the food product.

In a second aspect of the invention a method of picking up a food product from a pick up area and releasing it at a releasing location to a receiving location, for example a tray or a box, using a gripper device having a first jaw and a second jaw, each jaw having a leading edge, the jaws being configured to be moved by a moving mechanism relative to each other from a gripping position to an open position where there is a suitable opening between the leading edges so that the food product may be controllably released from the gripper device, and vice versa, wherein the method comprises:

moving the gripper device to a gripping position and picking up and gripping the food product, moving the gripper device to the releasing location, releasing the food product at the releasing location to the receiving location by means of moving the first jaw relative to the second jaw from the gripping position to the open position such that one side of the food product is un-supported from the first jaw while an other side of the food product is at least temporarily resting on the second jaw, so as to cause a tilting of the food product around a longitudinal axis of the food product when releasing the food product to the receiving location.

The food product has a skin-side and an opposite meat-side, wherein the step of releasing the food product from the releasing location to the receiving location is performed in such a way that a layering of similar or identical food products is performed at the receiving location such that the food products in adjacent layers are laying in a skin-to-skin contact or meat-to-meat contact.

The relative movement of the jaws by the moving mechanism may include a linear movement within a same plane where the leading edge of the first jaw faces the leading edge of the second jaw.

The method may further comprise the step of, subsequent to moving the first jaw relative to the second jaw from the gripping position to the open position, moving the second jaw in an upward direction.

The method may further comprise the step of moving the second jaw away from the first jaw while or subsequent to moving the second jaw upwards.

The method may further comprise the step of, prior to releasing the food product at the releasing location to the receiving location, adjusting a rotational direction of the gripper device along a vertical axis.

The method may further comprise the step of releasing the food product at the releasing location to the receiving location by means of a simultaneous movement of the jaws relative to each other from the gripping position to an open position such that no rotation around its longitudinal axis occurs.

In a third aspect of the invention, a robotic system comprising the gripper device as described earlier, further comprises a manipulation arm having a fastening mechanism at a free end of the manipulation arm, the fastening mechanism being configured to move the gripper device from the pick up area to the releasing location where the food product is released to the receiving location, and where the manipulation arm is configured to move the gripper device in at least three degrees of freedom movement up to six degrees of freedom movement.

The moving mechanism may be comprised in the robotic system.

BRIEF DESCRIPTION OF THE DRAWINGS

Embodiments of the invention will be described, by way of example only, with reference to the drawings, in which.

DESCRIPTION OF EMBODIMENTS

Figure 1A:
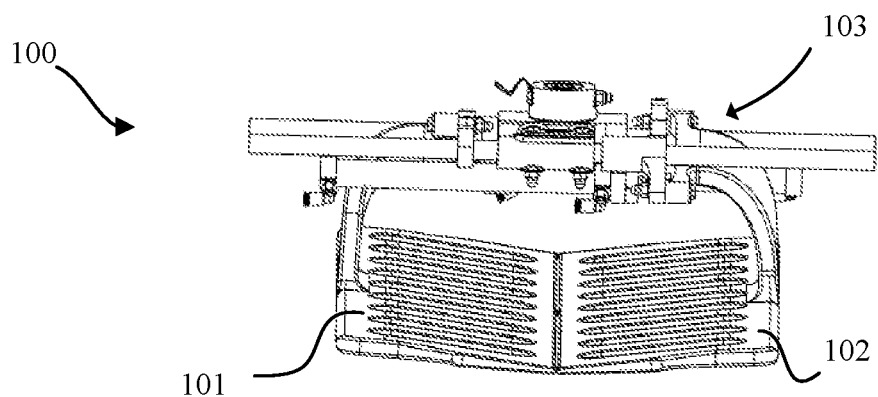
FIG. 1a is an elevated perspective view of a gripper according to an embodiment of the invention, where the jaws are in a gripping position.
Figure 1B:
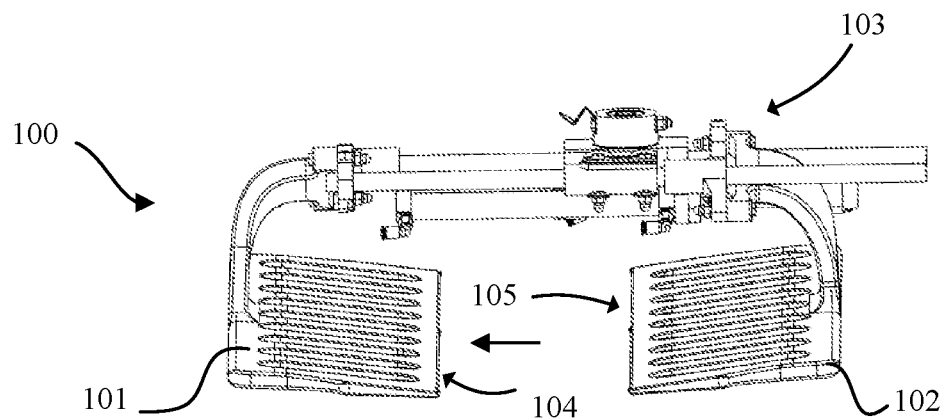
FIG. 1b is an elevated perspective view of the gripper of FIG. 1a, where the jaws are in a releasing position.

FIGS. 1a to 1c show the movement of a gripper device 100 according to an embodiment of the invention, the gripper device 100 being configured to be attached to a robotic device (not shown), for example a robotic arm, and to pick up a food product from a pick up area (not shown) and to release the food product 208 (see FIGS. 2a to 2d) at a releasing location (see FIGS. 2a to 2d) of the gripper to a receiving location 210, for example a tray or box. The term receiving location may according to the present invention be any surface area that received the food product, a tray or a box having an open end facing upwards.

The gripper device 100 has a first jaw 101 and a second jaw 102, the first jaw having a first leading edge 104 and the second jaw having a second leading edge 105. The jaws are configured to be moved by a moving mechanism 103 relative to each other from a gripping position (see FIG. 1a) to an open position (see FIG. 1b). The moving mechanism may be pneumatically operated via a linear pneumatic mechanism, or otherwise mechanically operated by a linear electric actuator. In the open position there is a suitable opening between the leading edges 104, 105 so that the food product may be controllably released (see FIGS. 2b, 2c and 2d) from the gripper device 100.

In FIG. 1a, the first jaw 101 and the second jaw 102 are in a gripping position, where the leading edges 104, 105 are adjacent each other. The leading edges may touch, but there may also be a gap between them, and they might even overlap if the jaws are not in the exact same plane. This state of the gripper 100 is used for gripping, holding and transporting a food product (not shown, see FIG. 2a, for example).

In FIG. 1b, the gripper 100 is shown in a state where the first jaw 101 and the second jaw 102 are moved apart using the moving mechanism 103.

In FIG. 1c, the gripper 100 is shown in an extreme opened state, where the jaws 101, 102 are separated as far apart as mechanically possible by the moving mechanism 103.

The leading edge 203 of the first jaw 201 may face the leading edge 204 of the second jaw 202 and the relative movement of the jaws, by the moving mechanism 103 (see FIG. 1a etc.), may include a linear movement within a same plane.

Figure 2A:
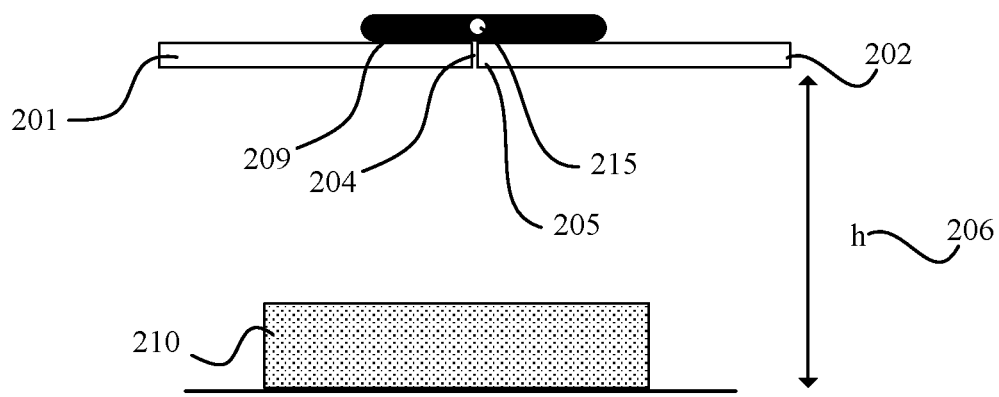
FIG. 2a is a schematic side view of a gripper according to an embodiment of the invention, where the jaws are in a gripping position.

During use, as is shown in FIGS. 2a to 2d, the jaws 201, 202 have picked up the food product 209 and the robotic device (not shown) subsequently has moved the gripper device 200 to the releasing location. In FIG. 2a, the first jaw 201 and the second jaw 202 of a gripper device are in their gripping position, with the first leading edge 203 of the first jaw and the second leading edge 204 of the second jaw adjacent each other, compare FIG. 1a, securely holding and transporting a food product 209. The jaws 201, 202 are placed at the pre-determined height 206 above the receiving location 210.

Figure 2B:
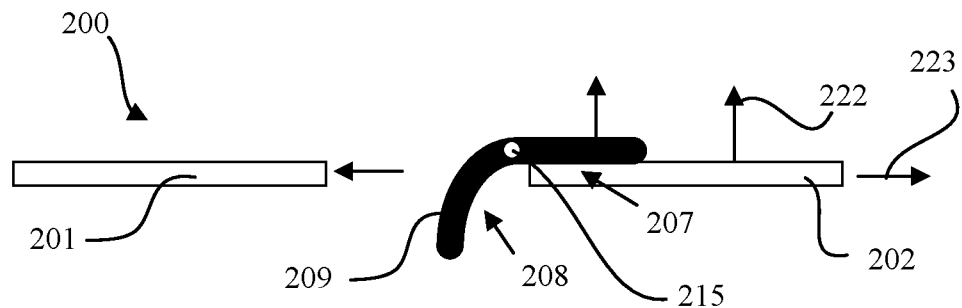
FIG. 2b is a schematic side view of a gripper of FIG. 2a, where the jaws are in a releasing position and a food product is starting to fall towards a receiving location.
Figure 2B:
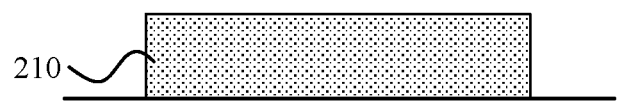

As is shown in FIG. 2b, at the releasing location, the food product is released from the gripper device 200 to the receiving location by moving the first jaw 201 relative to the second jaw 202 from the gripping position to the open position such that one side 208 of the food product 209 is un-supported from the first jaw 201 while an other side 207 of the food product is temporarily resting on the second jaw 202 so as to cause a tilting of the food product around a longitudinal axis 205 of the food product.

Subsequent to moving the first jaw 201 relative to the second jaw 202 from the gripping position to the open position, the second jaw may be moved in an upward direction as indicated by arrow 222 in FIG. 2b, either by means of moving the gripper device upwards by the robot device (not shown) or by means of moving the second jaw upwards relative to the first jaw via the moving mechanism, e.g. 103 as shown in FIG. 1. The tilting of the food product 208 may thus be enhanced which may result in that the height 206 of the gripper to the receiving location may be lowered. In this manner, the predictability of how the food product will land on the receiving location is improved.

In an embodiment, the moving mechanism may further move the second jaw 202 away from the first jaw 201 as indicated by arrow 223 while or subsequent to moving the second jaw upwards.

Figure 2C:
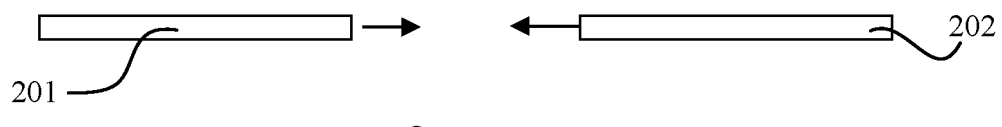
FIG. 2c is a schematic side view of a gripper of FIG. 2a, where the jaws are moving towards a gripping position and a food product touches down at a receiving location.
Figure 2C:
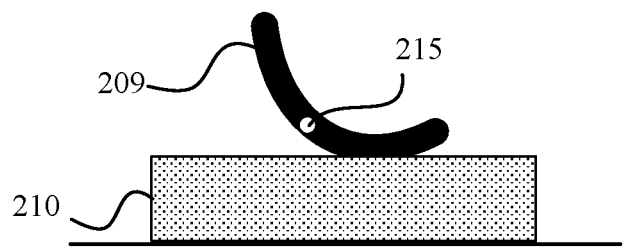

Thus, the food product is released to the receiving location 210 and into a tray or box, for example, as is shown in FIG. 2c. The first jaw 201 and the second jaw 202 may now be moved together again into the gripping position, or be left in the releasing position, or be opened even further as shown in FIG. 1c. The food product 209 lands on the receiving location 210 with the pre-set orientation about the longitudinal axis 205 of the food product. The gripper device is capable of controlling the rotational movement along the longitudinal axis 205 of the food product when releasing it to the receiving location. This may include any rotational angle, such as an example 45 degrees rotation, 90 degrees rotation, 180 degrees rotation.

Figure 2D:
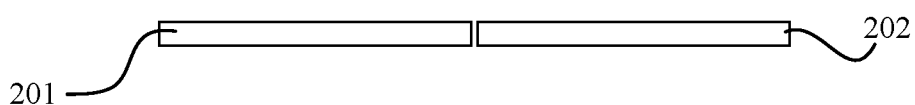
FIG. 2d is a schematic side view of a gripper of FIG. 2a, where the jaws are in a gripping position and a food product is fully at rest at a receiving location.
Figure 2D:
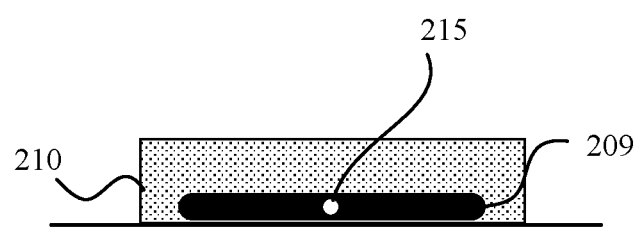

FIG. 2d shows the food product 209 fully resting on the receiving location 210. The first and second jaws 101, 102 are shown in their gripper position, however it is also possible to move the jaws into their open position to be ready to grip another food product after the gripper device 200 has been moved to the pickup area (not shown).

The food product 208 may be any type of a food product, such as fish fillets or poultry meat such as chicken fillet, where the tilting, which also be referred to as "flipping", may e.g. result in a better packing in e.g. a box or a tray. Another example where this may be of high relevance is where the food product has skin on one side, and where the placement of multiple of such a product requires that they are either placed in a skin-to-skin or meat-to-meat arrangement so as to avoid possible contamination.

The releasing location may be arranged at the pre-defined height 206 from the receiving location, the pre-defined height being selected such that when the food product 208 is received at the receiving location the food product has rotated around its longitudinal axis 205 in accordance to pre-defined rotational target angle.

Each of the first jaw 101, 201 and the second jaw 102, 202 may comprise a belt (not shown) of flexible material wrapped around the leading edges 104, 105, 203, 204 of the jaws such that at least a part of the belts becomes sandwiched between the jaws and the food product when the jaws penetrate below the food product when picking up the food product (gripping operation). The belts may be arranged such that when the jaws move below the food product and when the jaws release the food product to the receiving location, there is substantially no relative sliding movement between the sandwiched part of the belts and the food product and thus a minimized friction force is generated between the belts and the food product. This helps control the predictability of the placement of the food product at the receiving location as well as preserve the general shape of the food product.

Figure 3A:
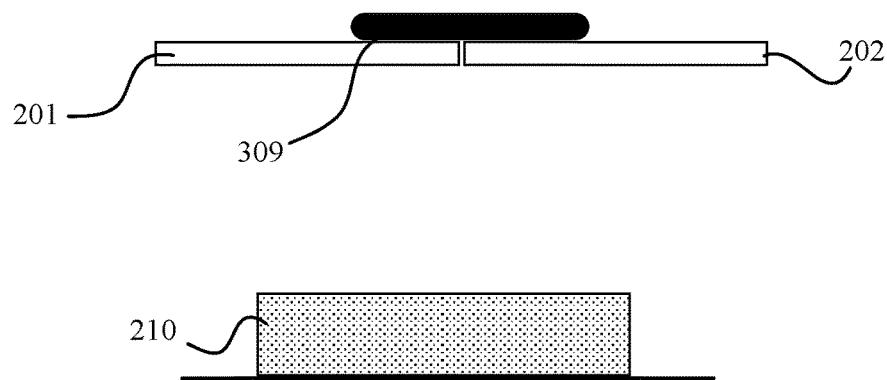
FIGS. 3a and 3b show the gripper in FIGS. 2a to 2d releasing a food product without tilting it.
Figure 3B:
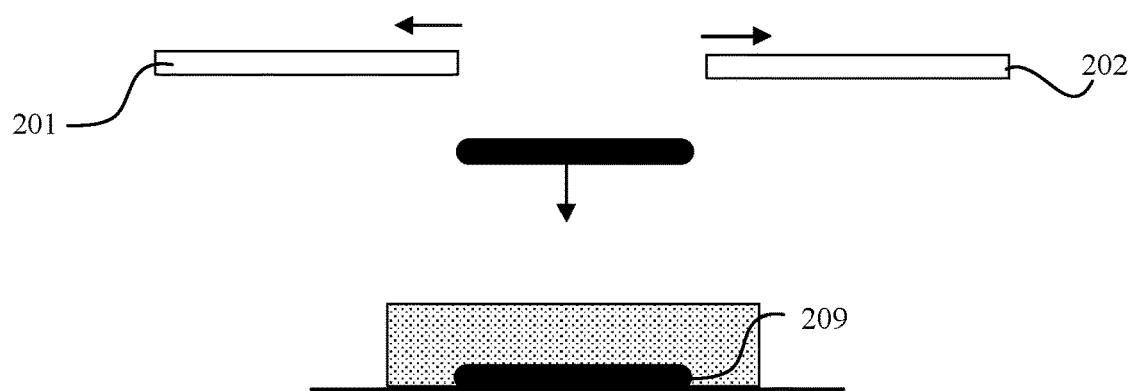

FIGS. 3a and 3b show the schematic gripper in FIGS. 2a to 2d where no "flipping" is required and where the subsequent food product is released directly onto the previous food product 209 by means of moving the first and the second jaws 201, 202 simultaneously in opposite directions as indicated by the horizontal arrows.

Figure 4:
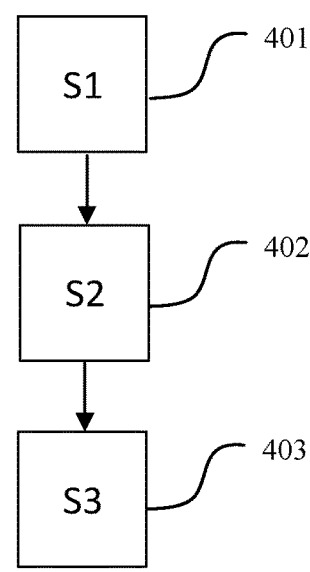
FIG. 4 shows a flowchart of an embodiment according to the present invention.

FIG. 4 shows a flowchart of a method according to the present invention for picking up a food product from a pick up area and releasing it at a releasing location to a receiving location, for example a tray or a box, using a gripper device having a first jaw and a second jaw, each jaw having a leading edge, the jaws being configured to be moved by a moving mechanism relative to each other from a gripping position to an open position where there is a suitable opening between the leading edges so that the food product may be controllably released from the gripper device, and vice versa.

In a first step (S1) 401 the gripping device picks up the food product.

In a second step (S2) 402 the gripper device is moved to the releasing location.

In a third step (S3) 403 the food product is released at the releasing location to the receiving location by means of moving the first jaw relative to the second jaw from the gripping position to the open position such that one side of the food product is un-supported from the first jaw while an other side of the food product is at least temporarily resting on the second jaw, so as to cause a tilting of the food product around a longitudinal axis of the food product when releasing the food product to the receiving location.

The food product may have a skin-side and an opposite meat-side, wherein the step of releasing the food product from the releasing location to the receiving location is performed in such as way that a layering of similar or identical food products is performed at the receiving location such that the food products in adjacent layers are laying in a skin-to-skin contact or meat-to-meat contact.

The relative movement of the jaws by the moving mechanism may include a linear movement within a same plane where the leading edge of the first jaw faces the leading edge of the second jaw.

The method may further comprise the step of, subsequent to moving the first jaw relative to the second jaw from the gripping position to the open position, moving the second jaw in an upward direction.

The method may further comprise the step of moving the second jaw away from the first jaw while or subsequent to moving the second jaw upwards.

The method may further comprise the step of, prior to releasing the food product at the releasing location to the receiving location, adjusting a rotational direction of the gripper device along a vertical axis.

The method may further comprise the step of releasing the food product at the releasing location to the receiving location by means of a simultaneous movement of the jaws relative to each other from the gripping position to an open position such that no rotation around its longitudinal axis occurs.

A robotic system, comprising the gripper device as described earlier, further comprises a manipulation arm having a fastening mechanism at a free end of the manipulation arm, the fastening mechanism being configured to move the gripper device from the pick up area to the releasing location where the food product is released to the receiving location, and where the manipulation arm is configured to move the gripper device in at least three degrees of freedom movement up to six degrees of freedom movement. The moving mechanism 103 may be comprised in the robotic system.

While the invention has been illustrated and described in detail in the drawings and foregoing description, such illustrations and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A gripper device configured to be attached to a robotic device and to pick up a food product from a pickup area and to release it from a releasing location to a receiving location, comprising:
    a first jaw and a second jaw, each having a leading edge, the jaws being configured to be moved by a moving mechanism relative to each other from a gripping position to an open position, where there is a suitable opening between the leading edges so that the food product may be controllably released from the gripper device, and vice versa,
    wherein during use the jaws pick up the food product and the robotic device subsequently moves the gripper device to the releasing location,
    wherein releasing the food product at the releasing location to the receiving location includes moving the first jaw relative to the second jaw from the gripping position to the open position such that one side of the food product is un-supported from the first jaw while an other side of the food product is temporarily resting on the second jaw so as to cause a tilting of the food product around a longitudinal axis of the food product when releasing the food product to the receiving location;
    wherein the releasing location is at a pre-defined height from the receiving location, the pre-defined height being selected such that when the food product is received at the receiving location the food product has rotated around its longitudinal axis in accordance to a pre-defined rotational target angle.

2. The gripper device according to claim 1, wherein the leading edge of the first jaw faces the leading edge of the second jaw and where the relative movement of the jaws by the moving mechanism includes a linear movement within the same plane.

3. The gripper device according to claim 2, wherein subsequent to moving the first jaw relative to the second jaw from the gripping position to the open position, the second jaw is moved in an upward direction, either by means of moving the gripper device upwards by the robot device or by means of moving the second jaw upwards relative to the first jaw via the moving mechanism.

4. The gripper device according to claim 3, wherein the moving mechanism is further configured to move the second jaw away from the first jaw while or subsequent to moving the second jaw upwards.

5. The gripper device according to claim 1, wherein each of the first and the second jaws comprises a belt of flexible material wrapped around the leading edges of the jaws such that at least part of the belts becomes sandwiched between the jaws and the food product when the jaws penetrate below the food product when picking it up, where the belts are arranged such that when the jaws move below the food product and when the jaws release the food product to the receiving location, there is substantially no relative sliding movement between the sandwiched part of the belts and the food product.

6. A method of picking up a food product from a pickup area and release it from a releasing location to a receiving location using a gripper device which comprises:
    a first jaw and a second jaw, each having a leading edge, the jaws being configured to be moved by a moving mechanism relative to each other from a gripping position to an open position where there is a suitable opening between the leading edges so that the food product may be controllably released from the gripper device, and vice versa,
    wherein the method comprises:
    moving the gripper device to a gripping position and picking up the food product,
    moving the gripper device to the releasing location,
    releasing the food product at the releasing location to the receiving location by means of moving the first jaw relative to the second jaw from the gripping position to the open position such that one side of the food product is un-supported from the first jaw while an other side of the food product is temporarily resting on the second jaw so as to cause a tilting of the food product around a longitudinal axis of the food product when releasing the food product to the receiving location;
    wherein the releasing location is at a pre-defined height from the receiving location, the pre-defined height being selected such that when the food product is received at the receiving location the food product has rotated around its longitudinal axis in accordance to a pre-defined rotational target angle.

7. The method according to claim 6, wherein food product has a skin-side and an opposite meat-side,
    wherein the step of releasing the food product from the releasing location to the receiving location is done in such a way that a layering of similar or identical food products is performed at the receiving location such that the food products in adjacent layers are laying in a skin-to-skin contact or meat-to-meat contact.

8. The method according to claim 6, wherein the relative movement of the jaws by the moving mechanism includes a linear movement within a same plane where the leading edge of the first jaw faces the leading edge of the second jaw.

9. The method according to claim 6, wherein the method further comprises, subsequent to moving the first jaw relative to the second jaw from the gripping position to the open position, moving the second jaw in an upward direction.

10. The method according to claim 9, wherein the method further comprises moving the second jaw away from the first jaw while or subsequent to moving the second jaw upwards.

11. The method according to claim 6, wherein the method further comprises, prior to releasing the food product at the releasing location to the receiving location, to adjust a rotational direction of the gripper device along a vertical axis.

12. The method according to claim 6, wherein the method further comprises releasing the food product at the releasing location to the receiving location by means of a simultaneous movement of the jaws relative to each other from the gripping position to an open position such that no rotation around its longitudinal axis occurs.

13. A robotic system comprising the gripper device according to claim 1, comprising:
   a manipulation arm comprising a fastening mechanism at a free end thereof configured to move the gripper device from the pickup area and to the releasing location where the food product is released to the receiving location, where the manipulation arm is configured to move the gripper device in at least three degrees of freedom movement up to six degrees of freedom movement.

14. The robotic system according to claim 13, wherein the moving mechanism is comprised in the robotic system.

* * * * *